United States Patent [19]

Takahashi

[11] 3,825,120
[45] July 23, 1974

[54] SIMPLIFIED FILTERING SYSTEM
[75] Inventor: Toshinao Takahashi, Tokyo, Japan
[73] Assignee: Kabushiki Kaisha Sayama Seikakusho, Tokyo, Japan
[22] Filed: July 20, 1972
[21] Appl. No.: 273,528

[30] Foreign Application Priority Data
July 28, 1971 Japan.............................. 46-55935
Aug. 13, 1971 Japan.............................. 46-60988
Apr. 5, 1972 Japan.............................. 47-33464

[52] U.S. Cl................ 210/104, 210/108, 210/117, 210/136, 210/138, 210/258
[51] Int. Cl........................................... B01d 23/24
[58] Field of Search....... 210/82, 90, 108, 136, 257, 210/258, 275, 277, 411, 412, 427, 117, 138, 139, 104

[56] References Cited
UNITED STATES PATENTS

| 2,084,346 | 6/1937 | Jones............................ 210/136 X |
| 2,087,775 | 7/1937 | Matthews...................... 210/257 X |
| 2,280,930 | 4/1942 | Reeves......................... 210/108 UX |
| 3,138,552 | 6/1964 | Richards....................... 210/108 X |
| 3,581,895 | 6/1971 | Howard et al. ................ 210/138 X |
| 3,616,915 | 11/1971 | Whitlock ....................... 210/138 X |
| 3,713,543 | 1/1973 | Heaney......................... 210/275 X |

Primary Examiner—Frank A. Spear, Jr.
Assistant Examiner—Robert H. Spitzer
Attorney, Agent, or Firm—Frank J. Jordan

[57] ABSTRACT

A simplified filtering system capable of repeating filtration of liquid and cleaning of the filter of the system with the filtrate alternately by use of simple electric control means and valvular means.

5 Claims, 4 Drawing Figures

SIMPLIFIED FILTERING SYSTEM

This invention relates to a filtering system and it particularly relates to a simplified filtering system capable of alternately repeating filtration and self-cleaning.

It has been known that such a filtering system conventionally used comprises, in combination, several values, multi-way cocks and the like to perform their functions. In the operation of the conventional filtering systems it is necessary to operate each of the valves, multi-way cocks and the like in order to alternate filtration with cleaning of the system, and it is further necessary to operate said valves, cocks and the like in a predetermined proper order for said alternation. Since the operating procedure for said alternation is so complicated as is seen from the above, the conventional filtering systems require expert operators and supervisors to be satisfactorily operated, thus making it difficult for any operator to operate them easily. Further, if these systems are automatic ones wherein the actuation of valves is power-operated and electrically controlled by use of an electric control board, and the order of actuation of the valves is necessarily fixed, the electric control board will have to be a very complicated one even if the automatic systems are of small capacity. The conventional systems usually require a large number of valves even if multi-way valves are used therein and further require, as incidental facilities, vacuum pumps in addition to ordinary pumps, since the direction of flow of liquid to be filtered or prefilt during filtration is opposite to that of flow of a washing liquid during cleaning. They are thus complicated in constitution, and their electric control board necessarily accommodates correspondingly many parts and is therefore complicated. The complicated operation of the systems will tend to make them disordered and, once they are in disorder, it will usually be impossible for anyone other than specialists in the art to find what part of the systems is out of order and it will take a long time for even the specialists to find the disordered part. From the foregoing, it will be seen that special technical knowledge is needed for maintaining and controlling such complicated filtering systems thus making it difficult for anyone to handle them with ease. Taking a long time to find such disorder and repair it, will interfere with an efficient operation of the systems or will render it impossible for the systems to supply drinking water for a long time without stoppage.

This invention has completely eliminated all of the aforementioned drawbacks, and the filtering system thereof need hardly use any other valves than check valves and can perform alternate filtration and its cleaning only by turning a change-over switch on a control board included in the system. If this system is an automatically operated one, it will need a very simplified electric control board and will be capable of being satisfactorily and safely operated by anyone without special technical knowledge of it owing to it having fewer portions which may get out of order when in use.

According to this invention liquid to be filtered (hereinafter referred to as "prefilt") is passed by the pumping action of a suction or supply pump to a filter tank where it is filtered, and the filtrate is withdrawn from the filter tank and then passed through a filtrate-reversing pump mainly to a filtrate tank and partly to a filtrate reservoir for reversing in the cleaning step. When a filtering pressure detector provided at the top of the filter tank detects that the pressure therein is raised to a predetermined filtering pressure due to the clogging of the filter medium in the filter tank, the suction pump is stopped while the reversing pump is operated for a predetermined period of time by use of a manual or electric control mechanism, to reverse the filtrate from the filtrate reservoir through the filter tank thereby cleaning the clogged filter medium and through the stopped filtering pump to a washings tank for discharge. After lapse of said predetermined period of time, the reversing pump is stopped and the suction pump restarted by use of the manual or electric control mechanism. The essential feature of this invention is that a cycle including such filtration and cleaning is repeated by the manual control mechanism or is automatically repeated by the electric control mechanism.

An object of this invention is to provide a simplified filtering system capable of manually controllable repetitive cycle operation.

Another object of this invention is to provide a simplified filtering system capable of electrically controllable, automated repetitive cycle operation.

Still another object of this invention is to provide such a filtering system wherein a cycle includes filtering and self-cleaning.

A further object of this invention is to provide such a filtering system wherein a control is provided for alternating filtering with cleaning when the filtering pressure within a filter tank of the filtering system is raised to a predetermined level.

A still further object of this invention is to provide such a system including (1) a pre-filtration division comprising a supply tank for containing prefilt, that is, liquid to be filtered, a supply pump, a washings tank, a supply pipe line connecting the supply pump to a filter tank, and a supply pipe line provided at the lower mouth opening with a washings inflow check valve which allows liquid to pass therethrough only in the direction from the supply tank to the supply pump and provided at the upper end with a two-way branch, one leading through the supply pump to a filter tank and the other to a washings tank through a washings back flow check valve which allows liquid to pass therethrough only in the direction toward the washings tank, (2) a filtration division comprising a filter tank containing a filter medium, a filtering pressure detector and an air escape each provided at the top of the filter tank and a pipe line leading from the filter tank to a filtrate tank through a reversing pump and a filtrate reversion check valve which allows passage of liquid therethrough only in the direction toward the filtrate tank, and (3) a reversing division comprising a filtrate reservoir, said reversing pump, a reversing pipe line connecting the filtrate reservoir to the reversing pump and provided at the lower mouth opening with a filtrate inflow check valve which allows passage of liquid therethrough only in the direction toward the reversing pump, and a filtrate supply line leading to the filtrate reservoir and branched from the line connecting the reversing pump to the filtrate tank downstream of the filtrate reversing check valve which allows passage of liquid therethrough only in the direction toward the filtrate tank.

The above, other objects and advantages of the filtering system will be undersood from the following description and accompanying drawings, in which.

Figure 1:
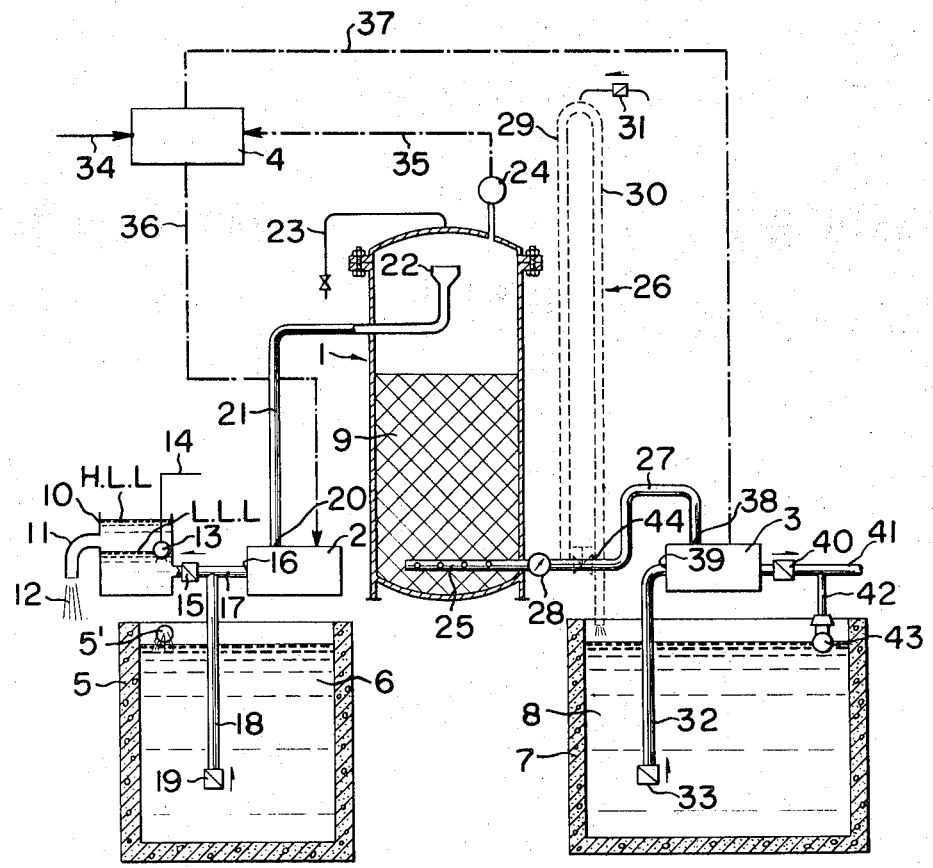
FIG. 1 is a diagrammatic sectional view of a filtering system embodying this invention.
Figure 2:
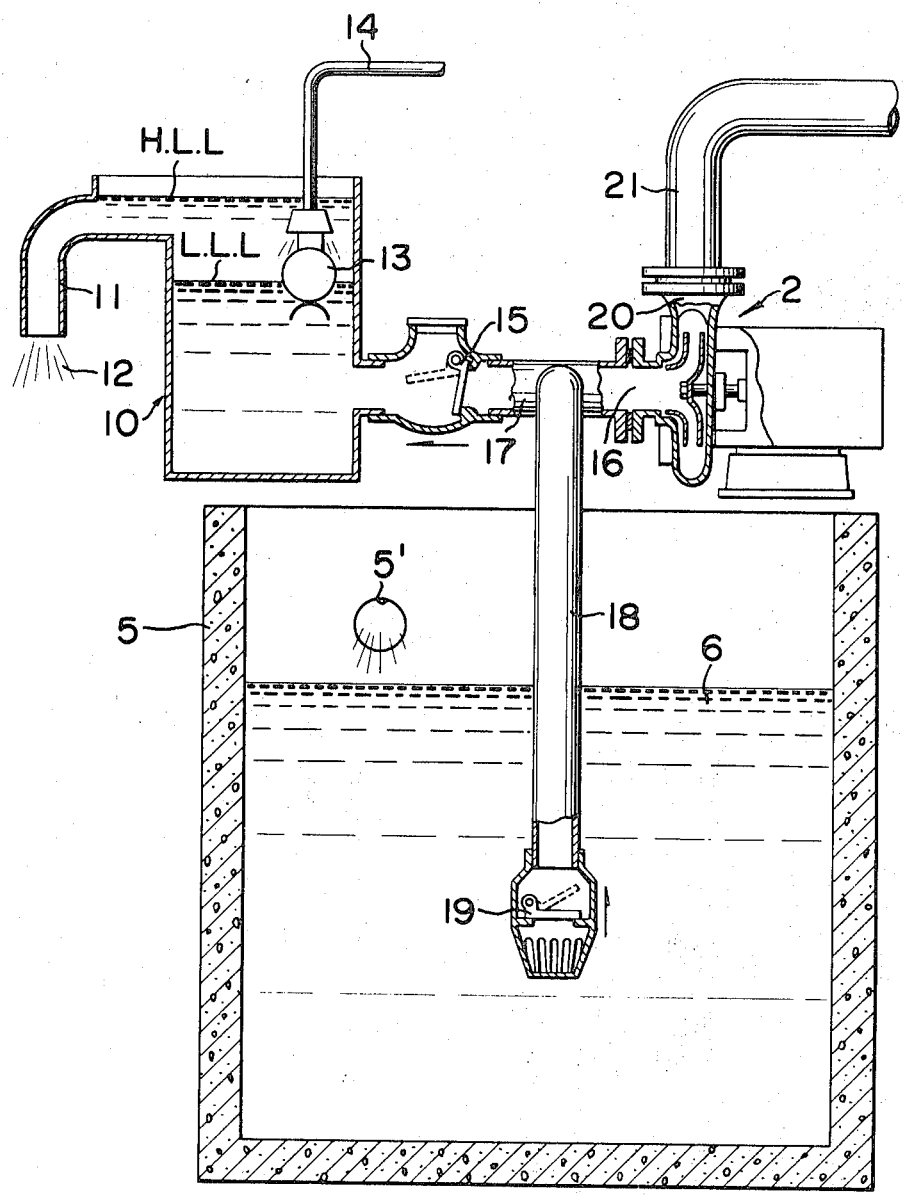
FIG. 2 is a diagrammatic sectional view, in more detail, of the members of a pre-filtration division of the filtering system in FIG. 1.
Figure 3:
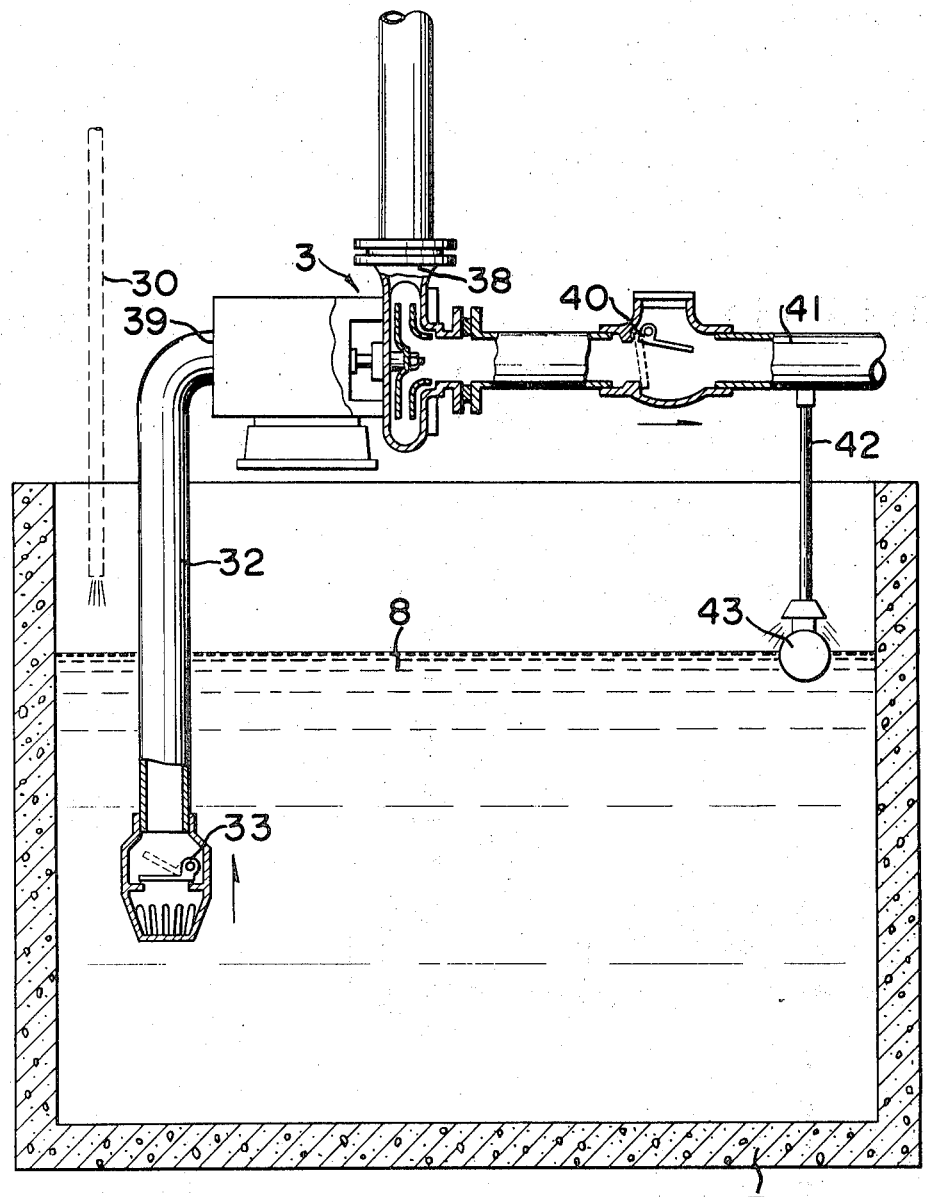
FIG. 3 is a diagrammatic sectional view, in more detail, of the members of a reversing division of the filtering system of FIG. 1.

Referring now to the drawings, a filtering system embodying this invention may be divided into three divisions to be described later, for the sake of clear explanation. With particular reference to FIGS. 1-3, the filtering system includes (A) a pre-filtration division comprising a supply tank 5 provided with an inlet 5' for liquid 6 to be filtered (prefilt 6), a suction or supply pump 2, a washings tank 10, a supply line 21 connecting the outlet opening of the pump 2 to a filter tank 1, and a supply pipe line 18 provided at the lower mouth opening with a washings inflow check valve 19 which allows passage of liquid therethrough only in the direction from the supply tank 5 to the supply pump 2 and provided at the upper end with a two-way branch, one branch leading through the supply pump 2 to the filter tank 1 and the other to a washings tank 10 through a washings back flow check valve 15 which allows passage of liquid therethrough only in the direction toward the washings tank 10, (B) a filtration division comprising the filter tank 1 containing a filter medium 9, a filtering pressure detector 24 and an air escape 23 each provided at the top of the filter tank 1, a perforated filtrate-collecting pipe line 25 extending from within the filter medium 9 sealably through the wall of the filter tank 1 to a flow meter 28, a pipe line 27 connecting the flow meter 28 to a reversing pump 3 having an inlet opening 39 and an outlet opening 38, and a pipe line 41 connecting the reversing pump 3 to a filtrate tank (not shown) and having a reversion check valve 40 interposed therein which allows passage of liquid therethrough only in the direction toward the filtrate reservoir 7, said reversing pump 3, a reversing pipe line 32 connecting the filtrate reservoir 7 to the reversing pump 3 and provided at the lower mouth opening with a filtrate inflow check valve 33 which allows passage of liquid therethrough only in the direction toward the reversing pump 3, and a filtrate supply line 42 leading to the filtrate reservoir 7 and branched from the line 41 downstream of the reversion check valve 40, the line 42 being provided at the lower end with a liquid level controller 43. The line 41 leading from the reversing pump 3 to the filtrate tank (not shown) constitutes a fourth conduit means.

With particular reference to FIG. 1, the filter tank 1, supply (or suction) pump 2 and reversing pump 3 are each power-operated. An electrical control panel or board is indicated at 4, and the prefilt 6 contained in the supply tank 5 may be water, oil, solvent or the like to be purified. A filtrate 8 from the filter tank 1 is passed through the perforated collecting line 25, flow meter 28, line 27, reversing pump 3, check valve 40 and line 41, to the filtrate tank (not shown), while it is partly passed through the branch line 42 and liquid level controller 43 to the filtrate reservoir 7 to the extent that the liquid level of filtrate 8 reaches a predetermined one controlled by the controller 43 in the reservoir 7. The filter medium 9 will comprise sand, gravel and stone layers as the top, intermediate and bottom layers, respectively, if filtration is carried out by the filter tank 1 using a "sand filtration system;" while it will further comprise a layer of particulate anthracite on the sand layer if the filtration is conducted using an "anthracite filtration system." The layer of sand may be replaced by a layer of particulate synthetic resin, a layer of laminated cloth or net of synthetic resin or natural fibers, or layer of porous material prepared by fixing said fibers with thermosetting synthetic resin as an adhesive. In the washings tank 10, H.L.L. shows a high liquid level during the filtering step and L.L.L., a low liquid level during the countercurrent cleaning step. The washings tank 10 is provided with an outlet opening 11 for discharging washings 12 and is replenished with liquid through a pipe line 14 provided at the end with a liquid level controller 13 for keeping the liquid level at the L.L.L. in the filtration step. The check valve 15 allows liquid to pass therethrough only in the direction indicated by the arrow symbol. The line 17 connects the inlet opening 16 of the supply pump 2 with the washings tank 10 via the check valve 15. The prefilt 6 in the supply tank 5 is passed through the check valve 19 submerged in the prefilt 6 and through the lines 18, 17 to the entrance 16 of the supply pump 2 by the action thereof. The check valve 19, which is provided at the lower end of the supply line 18, allows liquid only in the direction indicated by the arrow symbol. The pipe line 21, through which either the prefilt 6 or the filtrate 8 reversed is allowed to pass, connects the outlet opening of the supply pump 2 to the filter tank 1. The piping between the supply tank 5 and the filter tank 1 constitutes a first conduit means which includes the pipe 18, a portion of pipe 17, and the pipe 21. The piping between the washings tank 10 and the first conduit means constitutes a second conduit means which includes the portion of the conduit 17 in which the check valve 15 is located. The line 21 terminates within the upper part of the inside of the tank 1, and its end is in the form of an upwardly spreading funnel 22 in the Figure although said end may be in the form of a laterally or downwardly spreading funnel if such funnel serves to obtain a uniform outflow of the prefilt 6 therefrom and a uniform inflow of the reversed filtrate thereinto. The air escape 23, which is provided at the top of the filter tank 1, may be manually or electrically controlled. The filtering pressure detector 24 detects how the filtering rate decreases by finding an increase in filtering pressure of the prefilt 6 within the filter tank 1, the increase in pressure being caused by clogging of the filter medium 9. When the detector 24 detects that the filtering pressure has been raised to a predetermined level, it sends a signal 35 to the electric control board 4 which then transmits a signal 36 to the supply pump-driving motor (not shown) to stop the supply pump 2 and another signal 37 to the reversing pump-driving motor (not shown) to operate the reversing pump 3, thereby making it possible to control the operation of these pumps automatically. For this purpose, if desired, a non-automatic control will be available if a change-over switch to operate or stop the supply or reversing pump is provided on the electric control board 4 and is manually turned by an operator whenever the control board receives such a signal from the detector 24. The collecting pipe line 25 having many perforations is positioned in the lower part of the inside of the filter tank 1, collects the filtrate obtained by passing the prefilt 6 through the filter medium 9 and, in the countercurrent cleaning step, serves to distribute the reversed filtrate so that it passes substantially uniformly through every part of the filter medium 9 in the direction opposite to that in the filtration step. If desired, the filtrate 8 from the filtrate collecting pipe 25 may be passed through a siphonic pipe line 26 (indicated by dotted lines) directly to the filtrate reservoir 7 by closing a stop valve 44 (indicated by dotted lines). The line 26 consists of a rising pipe line 29 and falling pipe line 30, and it is provided at the highest portion with a siphon breaker composed of a branch line in which a check valve 31 is interposed. This valve allows liquid to pass only in the direction indicated by the arrow symbol. The collecting line 25 leads to the flow meter 28 from which the line 27 leads to the reversing pump 3. The meter 28 is for indicating the flow of the filtrate from the filter tank 1 and, if unnecessary, it may be dispensed with. With respect to the line 26, its highest portion should be more highly positioned than the top of the filter tank 1 and is, as previously mentioned, provided with the siphon breaker having the check valve 31. When the filtrate from the filter tank 1 is passed only through the siphonic line 26 to the filtrate reservoir 7 by closing the ordinary two-way valve 44, the siphon breaker will be needed if the inside of the line 26 is in the closed condition while it will be dispensed with if said inside is open to the atmosphere (for example, the lower end of the falling pipe 30 is positioned above the level of the filtrate 8 in the filtrate reservoir 7) thereby allowing the air from the atmosphere to enter the line 26 at the lower end of the falling pipe 30. The pipe line 32 provided with the check valve 33 submerged in the filtrate 8, which allows fluid to pass therethrough only in the direction indicated by the arrow symbol, is for passing the filtrate 8 from the reservoir 7 to the reversing pump 3. The piping between the filter tank 1 and the filtrate reservoir 7 constitutes a third conduit means and includes the pipes 25, 27 and 32. A power source is connected with the filtering system through a power line 34. In operating the filtering system in an automatic repetitive cycle, it is necessary that the filtering pressure detector 24 transmits a pressure detection signal 35 to the electric control board 4 and, in response to the signal 35, the control board 4 then transmits a signal 36 to the supply pump-driving motor to stop the pump 2 and another signal 37 to the reversing pump-driving motor to operate the pump 3.

The operating procedure of the present filtering system and the functions of the various members of this system will be explained hereunder.

In the filtering step, the prefilt 6 is supplied through the inlet opening 5' into the supply tank 5. By operating the supply pump 2, the prefilt 6 is drawn through the check valve 19 and lines 18, 17 to the supply pump 2 where it is pressurized and passed through the outlet opening 20 and the line 21 to the filter tank 1, while the check valve 15 interposed in the left side of the line 17 is closed by the action of negative pressure caused by the supply pump 2 in operation thereby preventing liquid in the washings tank 10 from being drawn by the pump 2. The reasons why the washings tank 10 containing the liquid is provided in the present filtering system are:

1. To prevent primed water from running out of the filtering system through the check valve 15 when the pump 2 is primed with the water at the time of its starting, and
2. To prevent the pump 2 from sucking in air when it is resumed to operate after the end of the countercurrent cleaning step.

Generally speaking, it is inevitable that check valves should somewhat leak liqiid due to deposition of fine solid particles contained in the liquid on the valve seat thereof. They are more liable to leak air due to its lower viscosity when they check the air than they check liquid. If they allow the air to leak therethrough, pumps associated therewith will draw the liquid less efficiently and will be subject to corrosion at their runners. If the pumps suck in or absorb the air in large amounts, this will make it impossible for them to draw the liquid.

To eliminate such troubles as mentioned above even if the check valves 15, 19 should be out of order thereby allowing passage of the air therethrough, the washings tank 10 is provided. In this tank 10, the liquid level is always maintained at a predetermined low liquid level (L.L.L.) by means of the liquid level controller 13 so that the pump 2 does not absorb the air. Whenever the liquid level lowers below the L.L.L., the tank 10 will be replenished with liquid passing through the pipe line 14 to the extent that the lowered liquid level rises to the L.L.L.. The line 14 may be connected to the upper part of the filter tank 1 or with a suitable part of the line 21 to supply the prefilt 6 therethrough to the washings tank 10 or, to this end, it may be communicated with the lower part of the filter tank 1, the collecting line 25 or the line 27. The washings tank 10 may further be supplied with liquid from other liquid sources independent of the above-mentioned ones.

The prefilt 6 from the supply pump 2 is passed to the filter tank 1 wherein it overflows at the open end 22 of the line 21. Since the filter tank 1 contains no liquid except for the air at the initial stage of filtering operation, the air present in the filter tank 1 is gradually dicharged therefrom to the atmosphere at the air escape 23 as the prefilt 6 is accumulated therein. The prefilt 6 is filtered by passing through the filter medium 9 in the filter tank 1 to obtain therefrom a filtrate which flows into the collecting pipe line 25 through the perforations made therein. The line 25 communicates with the line 27 through the flow meter 28. The siphonic line 26 may be branched from the line 27 between the flow meter 28 and stop valve 44 which is always open except when the filtrate from the tank 1 is passed through the siphonic line 26. The line 32 is provided at the lower end with the check valve 33 which allows liquid to pass only in the direction toward the reversing pump 3 as indicated by the arrow symbol. Thus, after the line 32 is full of the filtrate from the line 25, the succeeding filtrate therefrom flows through the line 27, reversing pump 3 and the line 41 in which the check valve 40 is interposed, mainly to the filtrate tank (not shown) and partly to the filtrate reservoir 7 until the liquid level therein reaches a predetermined one set by the liquid level controller 43. Even if the check valve 33 leaks the liquid present in the line 32 due to deposition of fine solid particles from the liquid on the valve seat thereof, the reversing pump 3 is always in a position to be supplied with the filtrate 8 thereby rendering it possible to successfully start the pump 3 any time without priming it when the cleaning step begins. In such case the conventional filtering systems have additionally needed a vacuum pump which serves to prime such reversing pump, while the filtering system according to this invention may dispense with such vacuum pump.

If the stop valve 44 is closed during the filtering step, the filtrate 8 from the line 25 will pass through the rising line 29 and falling line 30 to the reservoir 7, during which the siphon breaker fixed at the highest portion of the U-shaped line 26 is pressurized by the filtrate passing therethrough thereby closing the check valve 31 and consequentially preventing the filtrate to run out of this valve.

During the filtering step the filtering pressure is gradually increased as the flow rate of the filtrate from the filter tank is decreased. When the pressure has been raised to the predetermined one, the operator operates the electric control board to transmit a signal to the supply pump motor to stop the supply pump and a second signal to the reversing pump motor to put the reversing pump in operation. If the system is an automatic one in this case, the filtering pressure detector 24 will send a pressure detection signal 35 to the control board 4 which, in response to the signal 35 received, transmits a stoppage signal 36 to the supply pump motor to stop the supply pump while transmitting an operation signal 37 to the reversing pump motor to operate the reversing pump. If the valve 44 is closed and the line 26 is used in the automatic system, the siphon breaker 31, when the supply pump stops thereby stopping the filtrate flow, will allow the air to enter the line 26 therethrough and the air held in the highest (U-shaped) portion of the line 26 will break the siphonic formation whereby the filtrate contained in the falling line 30 falls into the reservoir 7.

In the cleaning step, the filtrate 8 in the reservoir 7 is drawn through the check valve 33 and line 32 by the pumping action of the reversing pump 3 where it is pressurized and passed through the line 27 to the collecting pipe 25. If the line 26 is provided in the filtering system, an ordinary valve may be interposed in this line to prevent the reversed filtrate from entering the lines 29, 30 although this filtrate will not reach the highest portion of the line 26 if the rising pipe 29 extends upward sufficiently higher than the filter tank 1. The reversed filtrate is ejected from the pipe 25 through the perforations thereof and passed upward through the filter medium 9 while cleaning it therewith and washing away the removed dirty foreign material therein, to the funnel-like opening 22 from which the washings are passed countercurrently with the prefilt 6 previously passed, through the line 21, supply pump while rotating the runners thereof in the direction reverse to that in the filtration step, line 17 and check valve 15 to the washings tank 10. At this time the check valve 19 is subjected to the reversed pressure of the washings thereby closing itself so that the washings cannot be passed through the line 18 to the supply tank 5. The washings 12 are discharged from the washings tank 10 at the outlet opening 11 after they have raised their level to a predetermined high liquid level (H.L.L.). The liquid level controller 13 closes its valve by the rise of the liquid level to a predetermined low liquid level (L.L.L.) in the washings tank 10, whereby replenishment of the tank 10 with liquid passing through the line 14 is completely stopped. The length of time required for the cleaning varies depending on the kind and degree of dirtiness of the liquid 6 being filtered, the kind of the filter medium 9 and the purity desired of filtrate 8 to be obtained, and it may be 10–30 minutes. Such a time length should be determined depending on such various factors as above, and the time may be set in a timer. It is to be particularly noted that any suitable liquid may be used in place of the filtrate 8 to be reversed in the cleaning step.

After conducting the cleaning or washing for a predetermined time, the reversing pump 3 is stopped and the supply pump 2 is operated again, thus resuming the filtering step. To carry out this procedure automatically, after the conduct of the cleaning for the predetermined time set by a timer means, the electric control board 4 transmits a stoppage signal to the reversing pump motor to stop this pump and an operation signal to the supply pump motor to operate this pump again, thereby resuming the filtering step. Alternatively, in this case, the detector 24 may further be designed to send a signal to the electric control board 4 thereby resuming the filtering step when it detects that the reversing pressure within the filter tank 1 is lowered to a predetermined level due to the removal of the impurities clogging the filter medium 9. In order to decrease the flow rate of filtrate passing through the filter medium 9, an adjustable valve may be interposed in the supply line 18 and this valve may be suitably adjusted while watching the flow meter 28. Alternatively, an adjustable valve may be interposed in the line 27 downstream of the flow meter 28. In this case, the more greatly the flow rate is decreased by use of the adjustable valve during the filtration step, the higher the filtering pressure in the filter tank 1 becomes whereby the filtering pressure detector 24 is likely to send a pressure detection signal to the control board 4 to start the countercurrent cleaning operation. To avoid this, it is recommendable to provide somewhere in the pipe lines a detector of a different type which sends a signal when detecting that the flow rate is decreased to a predetermined level in place of detection of the filtering pressure being raised to a predetermined level.

The filter tank 1 illustrated is a vertical one, but it is not limited to such a vertical one. It may be a horizontal filter or a filter in which a large number of filter medium bodies having a precoat of diatomaceous earth thereon, so far as said filter permits the filtration and cleaning to be alternately conducted in the liquid flow direction opposite to each other.

Figure 4:
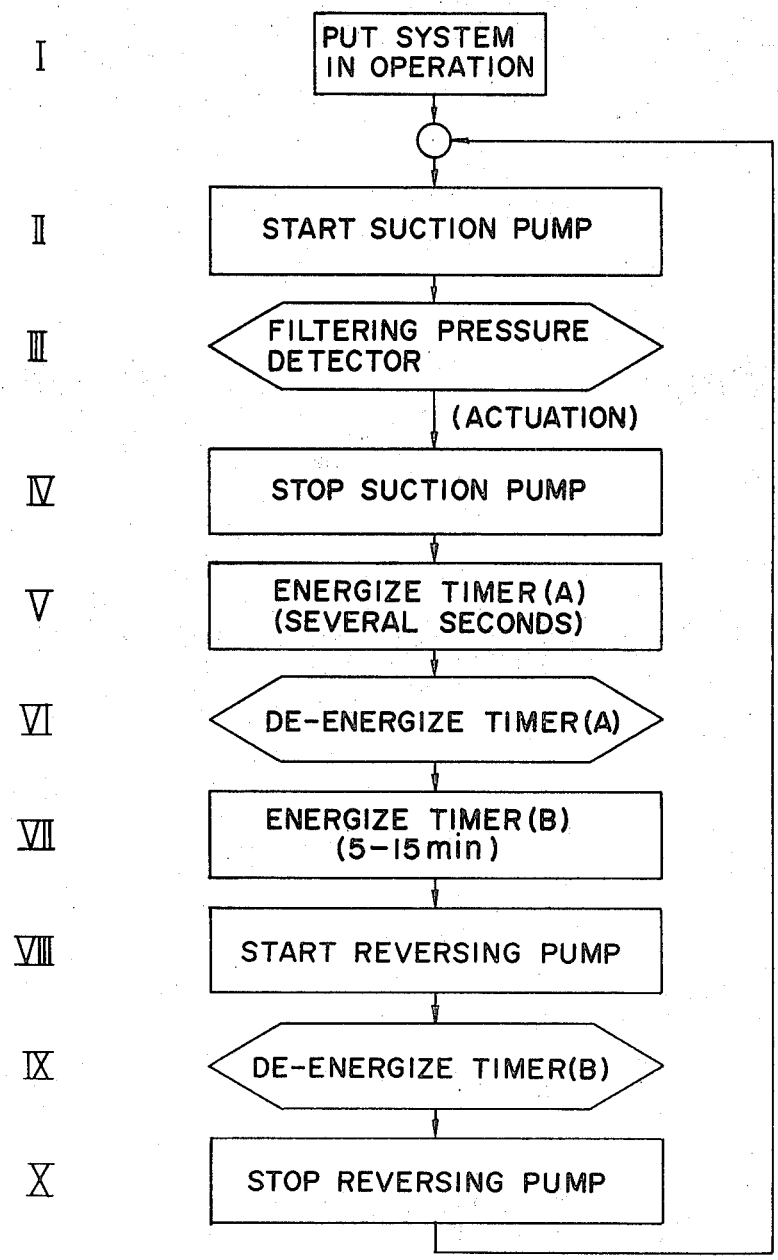
FIG. 4 is a flow chart showing the sequence of electric actuation of a filtering pressure detector, supply and reversing pumps and timers in the practice of this invention.

With reference to FIG. 4, is a flow chart, showing the sequence of electric operations on the control board 4 in the practice of this invention, a starting switch is depressed (I) to start (II) the suction or supply pump 2. When the filtering pressure within the filter tank is raised to a predetermined level set by the filtering pressure detector 24, the detector 24 sends (III) a pressure detection signal to the control board 4 which, in response to the signal received, transmits a stoppage signal to the supply pump motor to stop (IV) the pump 2 and energizes (V) a timer (A) to allow the flow of the prefilt 6 to have time to stop. When the timer (A) is de-energized (VI), a second timer (B) is energized (VII) to set a time for the cleaning and a starting signal is transmitted to the reversing pump motor to start (VIII) the pump 3. When the timer (B) is de-energized (IX), a stoppage signal is transmitted to stop (X) the reversing pump 3 and a starting signal to restart (II) the supply pump 2.

There may be a time interval of several seconds between the stoppage (X) of the reversing pump and the restart (II) of the supply pump, the time interval being obtained by energizing (V) the timer (A). The reason why a time interval (several seconds) is placed between the alternate stoppage and start of the supply and reversing pump is to permit the runners of the pump to have time to stop in order to avoid the back pressure being suddenly exerted on the still rotating runners. Such time interval is especially necessary for large-caliber pumps.

Unlike the conventional automatic filtering system wherein many power-operated valves and a complicated electric control board are used, the automatic filtering system according to this invention is a much simplified one which is reliably operative, easily controllable and low in construction and operation costs, thus greatly conducing to the development of the industries. This invention is effectively applicable to apparatus for the removal of iron and manganese impurities, for the repetitive cycle filtration of the water of water pools, for the production of drinkable or industrial water by filtration, for the filtration of used plating solutions and for the filtration of oils, various solvents or solutions.

What is claimed is:

1. A simplified automatic filtering system comprising:

a. a prefilt supply tank,
    b. a filter tank,
    c. first conduit means between said prefilt supply tank and said filter tank,
    d. a supply pump between said supply tank and said filter tank for supplying flow of prefilt in a first direction from said prefilt tank to said filter tank,
    e. a first check valve in said first conduit means providing one-way flow from said supply tank to said filter tank,
    f. a washings tank,
    g. second conduit means between said first conduit means and said washings tank,
    h. a second check valve in said second conduit means providing one-way flow from said first conduit means to said washings tank,
    i. a reversing pump having an inlet side,
    j. a filtrate reservoir for reversing filtrate,
    k. third conduit means between said filter tank and said filtrate reservoir and having a section thereof leading from said inlet side of said reversing pump to said filtrate reservoir,
    l. a third check valve in said section of said third conduit means providing one-way flow from said filtrate reservoir to said reversing pump,
    m. fourth conduit means leading from said reversing pump,
    n. a fourth check valve in said fourth conduit means providing one-way flow from said reversing pump,
    o. branch conduit means leading from said fourth conduit means downstream of said fourth check valve for supplying filtrate to said filtrate reservoir,
    p. a liquid level controller means in said branch conduit means for controlling the liquid level in said filtrate reservoir, and
    q. control means for stopping said supply pump and starting said reversing pump when the filtering pressure within said filter tank reaches a predetermined level to thereby cause filtrate to flow from said filtrate reservoir, through said filter tank to clean the latter, through the supply pump in a direction reverse that of said first direction, and thence to said washings tank for discharge,
    r. said control means being operable to effect change of flow between said first direction and said reverse direction without the use of any valves other than said check valves.

2. A simplified automatic filtering system according to claim 1 including a conduit for feeding water to said washings tank, and a liquid level controller for controlling the liquid level in said washings tank.

3. A simplified automatic filtering system according to claim 1 wherein said control means includes a filtering pressure detector on said filter tank and an electric control board, said electric control board including a timer, said control board being operable to transmit a stoppage signal to said supply pump to stop the latter upon receipt of a signal from said filtering pressure detector that the filtering pressure within said filter tank has been raised to a predetermined level due to clogging within said filter tank, said control board also being operable to transmit a starting signal to said reversing pump and maintain said reversing pump in operation for a predetermined time determined by said timer to thereby cause the filtrate present in said filtrate reservoir to flow in a reverse direction through said filter tank, thereby cleaning the clogged filter, and through said supply pump to said washings tank for discharge, said control board being operable, when said predetermined time has expired, to receive a signal from said timer and in response thereto to transmit a stoppage signal to said reversing pump to stop the latter and to also transmit a starting signal to said supply pump to start the latter again, said cycle of operation being automatically repeatable without the use of any valves other than said check valves.

4. A simplified automatic filtering system according to claim 1 wherein said first check valve is installed in an open end of said first conduit means.

5. A simplified automatic filtering system according to claim 1 wherein said third check valve is installed in an open end of said third conduit means.

* * * * *

UNITED STATES PATENT OFFICE
CERTIFICATE OF CORRECTION

Patent No. 3,825,120           Dated July 23, 1974

Inventor(s) Toshinao TAKAHASHI

It is certified that error appears in the above-identified patent and that said Letters Patent are hereby corrected as shown below:

On the first page, delete the assignee "Kabushiki Kaisha Sayama Seikakusho" and replace with --Nippon Filcon Co., Ltd--.

Signed and sealed this 29th day of October 1974.

(SEAL)
Attest:

McCOY M. GIBSON JR.           C. MARSHALL DANN
Attesting Officer           Commissioner of Patents